United States Patent
Schuler et al.

(10) Patent No.: US 6,203,647 B1
(45) Date of Patent: Mar. 20, 2001

(54) METHOD OF PRODUCING A WOUND INSULATING PIPE

(75) Inventors: Klaus Schuler; Dieter Lorenz, both of Berlin; Walter Gross, Herzogenaurach; Stefan Hain, Effeltrich; Hans-Henning Lessmann-Mieske, Neutraubling; Hans Schmuck, Regensburg; Karl Stenzel, Deuerling, all of (DE)

(73) Assignees: Siemens Aktiengesellschaft; Maschinenfabrik Reinhausen GmbH, both of (DE)

( * ) Notice: Subject to any disclaimer, the term of this patent is extended or adjusted under 35 U.S.C. 154(b) by 0 days.

(21) Appl. No.: 09/242,659
(22) PCT Filed: Aug. 21, 1997
(86) PCT No.: PCT/DE97/01867
§ 371 Date: Dec. 27, 1999
§ 102(e) Date: Dec. 27, 1999
(87) PCT Pub. No.: WO98/08229
PCT Pub. Date: Feb. 26, 1998

(30) Foreign Application Priority Data

Aug. 21, 1996 (DE) ................................ 196 35 372

(51) Int. Cl.⁷ .............................. G02B 6/44; H01B 19/00
(52) U.S. Cl. ......................... 156/171; 156/173; 156/187; 385/104; 385/113
(58) Field of Search ................................. 156/167, 171, 156/173, 178, 187; 385/104, 109, 110, 113; 343/873, 895

(56) References Cited

U.S. PATENT DOCUMENTS

| 3,485,940 | 12/1969 | Perry et al. . |
| 4,610,033 | 9/1986 | Fox, Jr. . |
| 5,087,110 | * 2/1992 | Inagaki et al. ....................... 385/110 |

FOREIGN PATENT DOCUMENTS

| 27 55 734 | 7/1978 | (DE) . |
| 29 01 872 | 7/1980 | (DE) . |
| 38 15 717 | 11/1989 | (DE) . |
| 39 21 442 | 1/1996 | (DE) . |
| 0 146 845 | 7/1985 | (EP) . |
| 0 265 737 | 5/1988 | (EP) . |
| 0 720 181 | 7/1996 | (EP) . |
| 2 725 302 | 4/1996 | (FR) . |
| 58-107037 | 6/1983 | (JP) . |
| 94 06127 | 3/1994 | (WO) . |

OTHER PUBLICATIONS

MR Maschinenfabrik Reinhausen, "MR—Isolierrohre ROTAFIL® für die Hochspannungstechnik", May 1991.

* cited by examiner

Primary Examiner—Sam Chuan Yao
(74) Attorney, Agent, or Firm—Kenyon & Kenyon

(57) ABSTRACT

A method for producing a wound insulating conduit, in particular for a high-voltage insulator, with at least one empty channel for subsequent insertion of a conductor, e.g., an optical fiber. First layers of a material to be wound are applied first, then a molded body provided with at least one empty conduit is applied to a resulting surface and wrapped by additional layers. The molded body has lateral projections which extend over an entire length of the empty conduit and are designed so that they correspond to the surface to which it is secured.

4 Claims, 2 Drawing Sheets

METHOD OF PRODUCING A WOUND INSULATING PIPE

FIELD OF THE INVENTION

The present invention relates to a method of producing a wound insulating conduit, in particular for a high-voltage insulator, with at least one channel for conductors, optical fibers or the like to be pulled in subsequently.

BACKGROUND INFORMATION

Insulating conduits and high-voltage insulators with integrated conductors, optical fibers in particular, are known in a variety of embodiments. European Patent No. 0 265 737 describes such an arrangement, where an optical fiber is wound in a spiral along an optical fiber carrier, the latter of which is in turn designed as an insulating wind located in a an cavity of a high-voltage insulator.

Another arrangement is described in U.S. Pat. No. 3,485, 940, where an optical fiber is surrounded by a polyester tube which passes through a core of a insulator in a longitudinal direction.

European Patent No. 0 146 845 describes another high-voltage insulator, where a light guide is carried longitudinally through the insulator in a groove in an intermediate layer arranged between a core and shielding elements.

With the high-voltage insulators described below, the optical fiber is usually pulled subsequently into the prefabricated insulator or insulating conduit. German Patent No. 27 55 734 describes the use of longitudinal grooves forming channels to accommodate the optical fibers with these channels then being closed. Similarly, it is described in French Patent No. 0 2 725 302 that a groove in the form of a spiral can be provided in the wall of the insulator, and a continuous extruded ribbon of elastomer can be introduced into this groove. Then a optical fiber is placed on a top side of this ribbon and then the optical fiber and the ribbon are compressed, e.g., by rolling, to insert the ribbon into a bottom of the groove and embed it in the elastomer material.

German Patent No. 29 01 872 describes the use of an optical fiber in an intermediate layer running in a longitudinal direction, and exiting from this intermediate layer through holes.

German Patent No. 39 21 442 also describes the use of empty cables for subsequent insertion of optical fibers having an insertion aid for subsequent insertion of these optical fibers.

A conventional method of producing high-voltage insulators is by winding insulating conduits made of epoxy resinates with a laminate structure of glass fibers or synthetic fibers. Such insulating conduits are known from the brochure "MR-Isolierrohre ROTAFIL® für die Hochspannungstechnik" (MR-ROTAFIL® Insulating Conduits for High Voltage Technology), imprint VK23-0/88de. In these winding methods, it is not readily possible to wind empty conduits, because it results in air-filled gaps at a side of the wound empty conduit having a negative effect on dielectric and electrical properties.

SUMMARY OF THE INVENTION

An object of the present invention is to provide a suitable method of producing a wound insulating conduit with at least one integrated channel for subsequent insertion of at least one optical fiber, where the total cross section of the insulating conduit produced in this way is to be filled with material, i.e., there will not be any air-filled gaps in an area of the at least one integrated channel.

In addition, a contour should differ only insignificantly from a circular shape.

A special advantage of the method according to the present invention is that winding a molded body composed of at least one empty conduit and lateral, curved or flexible projections ensures that no cavities, i.e., air inclusions, can develop in winding the conduit that would have a negative effect on electric or dielectric properties. It is possible to design the lateral projections on the molded body with a curvature which is adapted to a curvature of a surface of the respective insulating conduit to which the molded body is attached. In such a case, winding without cavities is made possible due to the adapted curvature.

It is also possible to design the lateral projections on the molded body to be flexible, so that they can adapt to any surface curvature where they are to be attached and cavities can again be avoided in winding the conduit.

DETAILED DESCRIPTION

Figure 1A:
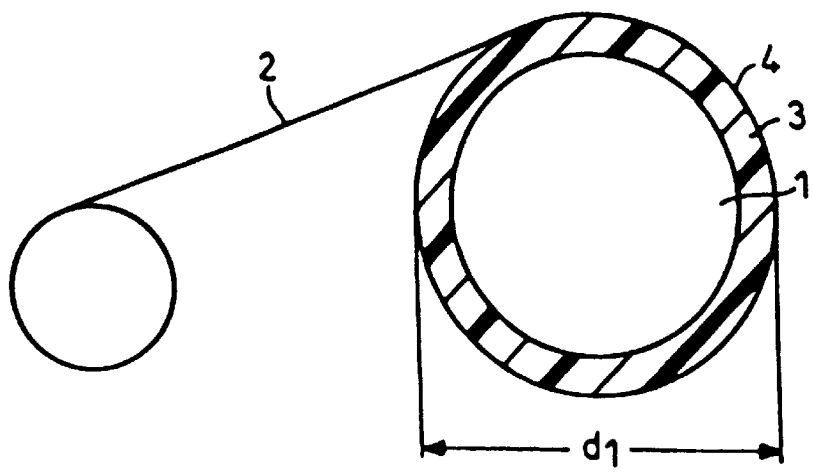
FIG. 1A illustrates a first phase of a method according to the present invention.

The process steps are as follows:

In a first phase, as illustrated in FIG. 1A, first layers 3 of material 2 to be wound up, such as rovings, ribbon or fibers are wound onto a winding mandrel 1 of a conventional winding machine up to a certain thickness $d_1$ and then impregnated with resin. Next, these first layers 3 are cured to the maximum possible degree by a known method. This yields a laminate structure; it is especially advantageous to use epoxy resin as the resin and glass or synthetic fibers, e.g., polyester fibers, as the material to be wound.

A mixed laminate structure is also possible, with a polyester nonwoven being provided on the inside, for example, directly on the winding mandrel, and applying the material to be wound, such as glass fibers, to the polyester nonwoven.

Figure 1B:
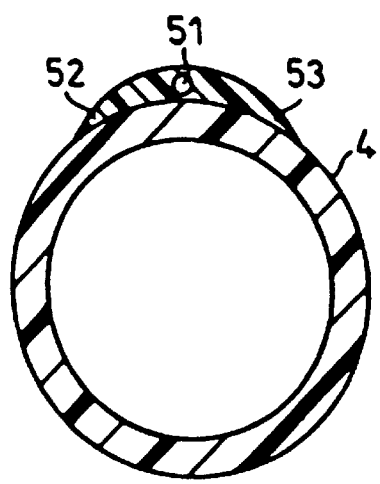
FIG. 1B illustrates a second phase of the method according to the present invention.

In a second phase, as illustrated in FIG. 1B, a molded body 5 is positioned to resulting surface 4 and secured there. Molded body 5 has an empty conduit 51 and, laterally thereof, curved projections 52, 53 made of insulation material, which extend in a longitudinal direction over an entire length of empty conduit 51. A lower curvature of the molded body is adapted to a curvature of surface 4 which is formed after reaching thickness $d_1$. If curved projections 52, 53 are designed to be flexible, it is also possible for them to automatically adapt to the curvature of surface 4 as winding is continued.

Figure 1C:
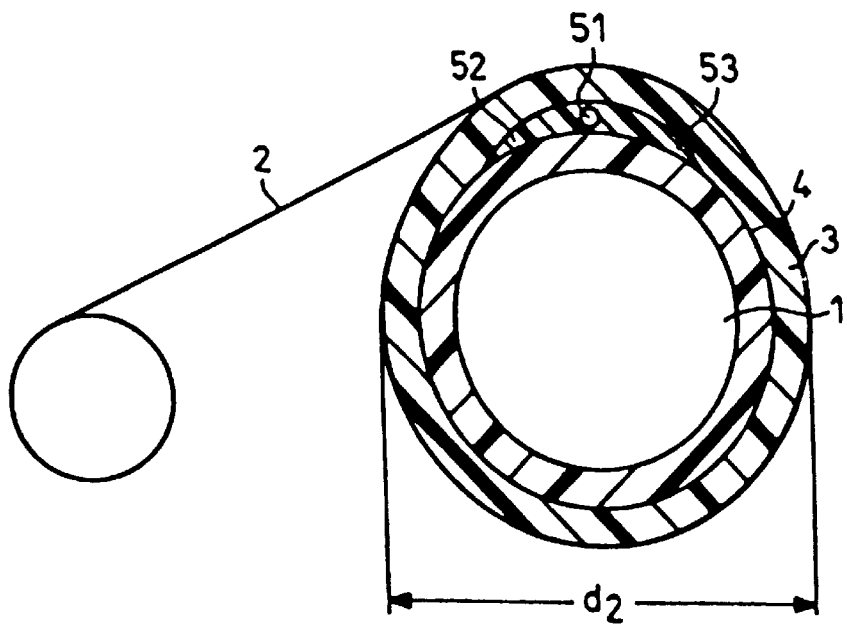
FIG. 1C illustrates a third phase of the method according to the present invention.

In a final phase, as illustrated in FIG. 1C, winding is continued, i.e., additional layers 6 of material 2 are wound until reaching final diameter $d_2$ of the insulating conduit.

As mentioned above, a mixed laminate structure is also possible, with different materials being wound in succession, so that first layers 3 and additional layers 6, either alone or individually, may be made of different materials. For example, it is possible to wind aL cover layer of polyester fibers onto a layer of glass fibers.

It is especially advantageous to make the entire molded body 5 of flexible insulation material. Thus, it is also possible to apply the molded body to first surface 4 in a spiral pattern.

Figure 2:
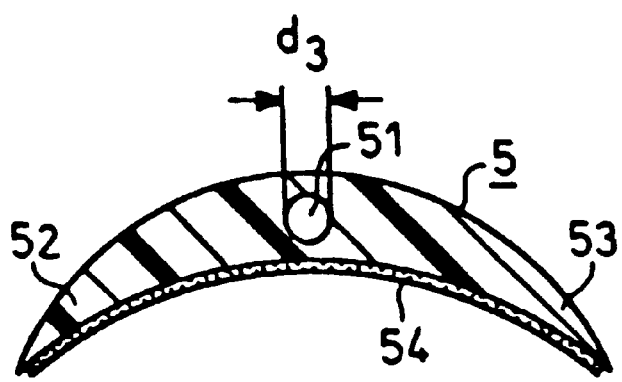
FIG. 2 illustrates a first suitable molded body.
Figure 3:
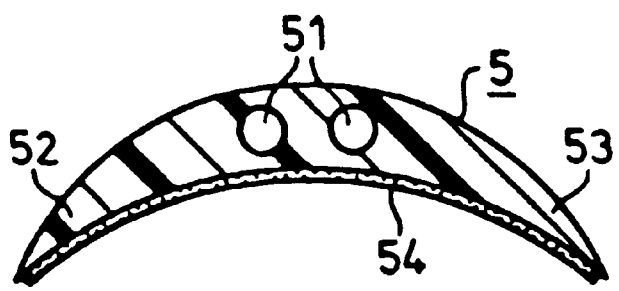
FIG. 3 illustrates a second suitable molded body.

The molded body may be secured to this surface 4 by a self-stick coating 54 on a bottom side, as illustrated in FIGS. 2 and 3, showing different molded bodies 5. It is quite possible to keep a supply of continuous molded body strands prefabricated on a roll, then finishing them as needed only when applied to the prewound insulating conduit.

In many cases, it is advantageous to pretreat surface 4 before winding further, in order to improve the adhesion of layers 6, to be wound subsequently, to this surface. This pretreatment may be mechanical, e.g., by roughening, or chemical;, e.g., by a primer treatment.

For most industrial applications, insulating conduits have a total diameter of about 100 to 1000 mm. In view of the fact that cables or optical fibers to be drawn into the channel subsequently are usually only a few millimeters thick, in most cases diameter $d_3$ of the empty conduit and thus the total height of molded body 5 will also have a thickness of this order of magnitude. Thus, the cross section of the finished insulating tube differs only slightly from a circular shape, which will not cause any problem at all for many applications. It is also readily possible to then machine the outside surface to produce an accurate circular shape.

What is claimed is:

1. A method for producing a wound insulating conduit for a high-voltage insulator; the wound insulating conduit having at least one channel for at least one of conductors and optical fibers to be subsequently drawn in, comprising the steps of:

winding onto a winding mandrel first layers of a material until a first diameter is achieved, the material including one of rovings, a ribbon of glass, fibers of glass, and synthetic material;

impregnating the first layers with resin to form a sheathing;

positioning and securing a molded body on an outer surface of the sheathing, the molded body having at least one empty conduit forming a channel, wherein lateral projections extend in a longitudinal direction over an entire length of the at least one empty conduit; and winding additional layers of the material onto the winding mandrel until a final diameter of the insulating conduit is achieved.

2. The method according to claim 1, further comprising the step of:

pretreating the outer surface at least one of mechanically and chemically prior to the step of winding additional layers of the material.

3. The method according to claim 1, further comprising the step of:

selecting a lower curvature of the lateral projections so that the lower curvature corresponds to a curvature of the resulting surface.

4. The method according to claim 1, wherein the lateral projections are made of a flexible material so that the lateral projections press tightly onto the resulting surface during the step of winding the additional layers of the material.

* * * * *